No. 683,751. Patented Oct. 1, 1901.
B. A. GUY.
CARBURETER.
(Application filed Nov. 26, 1900.)
(No Model.)
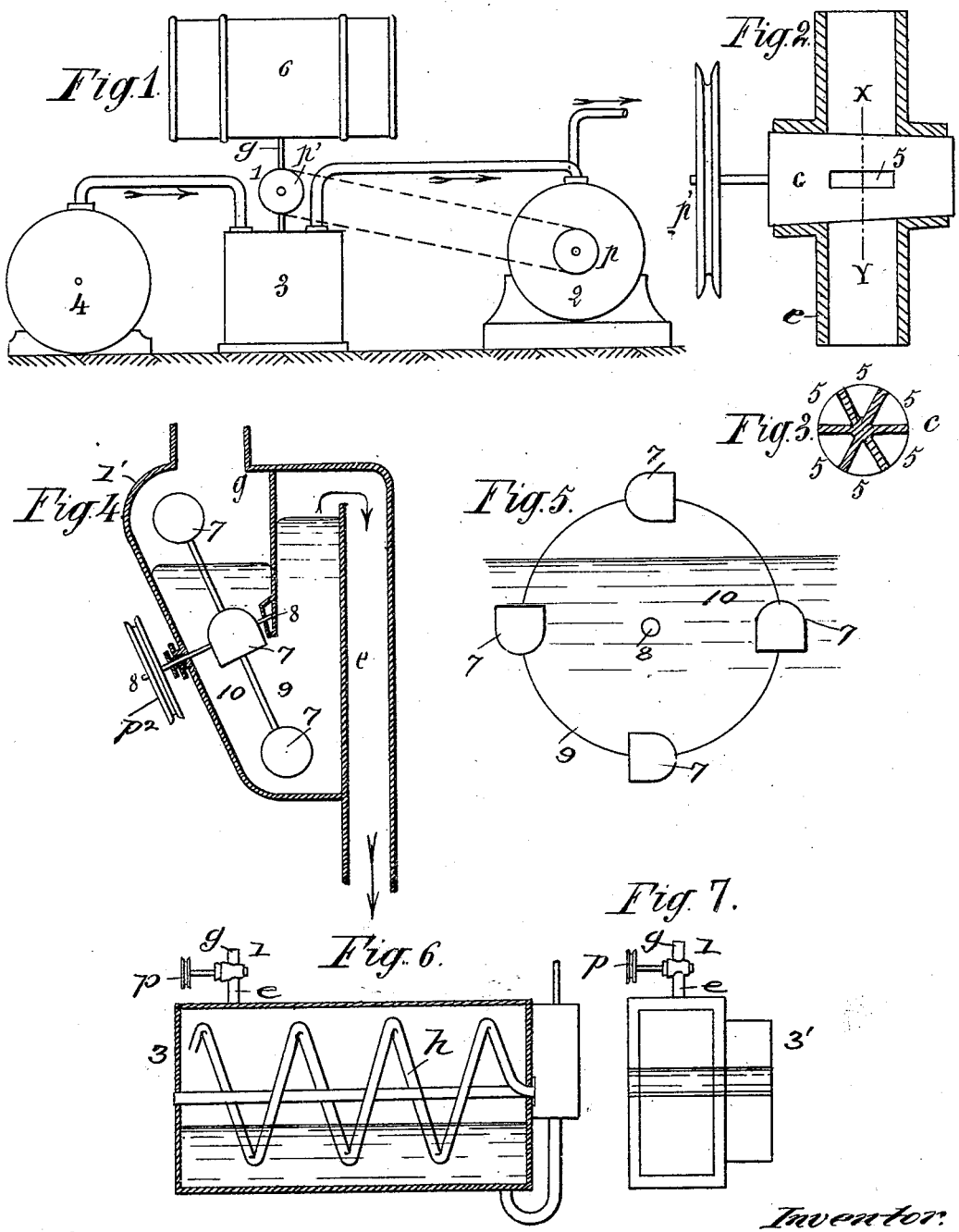
Witnesses,
Julius Katz
John Lotka
Inventor:
Benjamin A. Guy.
By
Munn & Co
Attorneys

UNITED STATES PATENT OFFICE.

BENJAMIN ALFRED GUY, OF PARIS, FRANCE.

CARBURETER.

SPECIFICATION forming part of Letters Patent No. 683,751, dated October 1, 1901.

Application filed November 26, 1900. Serial No. 37,780. (No model.)

*To all whom it may concern:*

Be it known that I, BENJAMIN ALFRED GUY, engineer, a citizen of the French Republic, residing at Paris, France, have invented a certain new or Improved Apparatus for Producing a Constant Mixture of Air and the Vapor of Volatile Liquids, of which the following is a specification.

The processes hitherto known for producing the constant mixture of air and the vapor of volatile liquids, particularly the apparatus known as "air-carbureters," in which the volatile liquid is a hydrocarbon, have all the great disadvantage of producing a mixture which is essentially variable, according to the temperature, discharge of gas, and duration of the process. In the case of carbureters the variability of the mixture produced—that is, carbureted air—necessitates regulation by means of taps, furnaces, and motors each time the temperature, the discharge of gas, or the period of lighting changes to any appreciable extent.

The object of this invention is to produce the constant mixture of air and the vapor of volatile liquids.

In the accompanying drawings, Figure 1 is a diagrammatic view of the whole apparatus. Fig. 2 is a vertical section of one form of feed device. Fig. 3 is a cross-section of Fig. 2 on the line X Y. Fig. 4 is an end view of another form of feed device. Fig. 5 is a side view of part thereof. Figs. 6 and 7 are diagrammatic views of two forms of a combined vaporizer and vapor-feeder.

The apparatus comprises in combination a feed device 1 for the volatile liquid, (to give an example the latter is assumed to be hydrocarbon,) an ordinary gas-meter 2, a combined vaporizer and vapor-feeder 3, and a blower 4. The feed device 1 for the volatile liquid is connected, on the one hand, to the top of the combined vaporizer and vapor-feeder 3 and, on the other hand, to the base of a receptacle 6, containing hydrocarbon. The gas-meter is so placed that carbureted and not pure air passes through said meter. The horizontal shaft of the gas-meter passes through the outer jacket thereof, through a stuffing-box, and carries a pulley or wheel $p$. This pulley or wheel is connected by means of a chain or other means of transmission with another wheel $p'$, attached to the liquid-feeder, so that when the meter is working the feeder is also operated. The feeder essentially consists of or is provided with cavities or the like which are filled with hydrocarbon from the before-mentioned hydrocarbon-receptacle and emptied into the vaporizer.

The following are two examples of a feeder constructed according to the principle of this invention: In one form, Figs. 2 and 3, the feeder 1 consists of a rotary plug $c$, having a number of recesses or chambers (for instance, six) adapted to register successively with the hydrocarbon-supply pipe $g$, connected with the receptacle 6 and then with the discharge-pipe $e$, leading to the combined vaporizer and vapor-feeder 3. When the plug $c$ has made a complete revolution, six equal quantities of hydrocarbon will have fallen into the vaporizer. In the second construction $1'$ of the feeder, Figs. 4 and 5, the cavities or cups 7 (four are shown in Fig. 5) are arranged on the periphery of a small wheel 9, the shaft 8 of which is horizontally inclined and carries a wheel $p^2$, adapted to be driven from the wheel $p'$ of the meter 2. About three-fourths of the said wheel are immersed in a mercury-bath 10, forming a hermetical joint between the pipe $g$, which communicates with the receptacle and is full of hydrocarbon, and the pipe $e$, which communicates with the vaporizer. Thus on each complete revolution of the wheel four equal quantities of gasolene will fall into the vaporizer. The specific construction of the combined vaporizer and vapor-feeder is not a material feature of my invention as long as this element of the apparatus comprises a casing containing a body of a non-volatile liquid, into which dips a movable part, preferably a rotary one, which brings about a close contact of the volatile liquid with the air and at the same time compresses and feeds the vapor. The vapor-feeding vaporizer 3 (shown in Fig. 6) is provided with a rotable Archimedean screw $h$, dipping into water or other non-volatile liquid. In Fig. 7 the vapor-feeding vaporizer $3'$ consists of an ordinary gas-meter having a rotary drum $i$, dipping into water. In each case hydrocarbon leaving the feeder $1'$ or 1, respectively, falls upon the water, over which it spreads in an exceedingly thin layer. On revolution the inner surfaces of the Archimedean screw $h$ or drum $i$ become lined with a film of this hydrocarbon, which consequently evaporates—that is to say, the hydrocarbon is vaporized and at the same time the vapor is compressed and propelled or fed to the meter 2. If the drum $i$ of the meter $3'$ is connected with a motor or driving device—for instance, a weight—the meter 2 can be dispensed with, the wheel $p'$ being in this case mounted on the shaft of the drum $i$.

As the driving mechanism of the feed device is directly connected with that of the gas-meter, it follows that the fall of hydrocarbon into the vaporizer will be proportionate to the discharge of carbureted air. The gas will therefore be uniform.

The advantages of the apparatus as a carbureter are the following: It is very simple and comprises no especially constructed parts except the actual feed device, which is easily made. It does not necessitate the employment of a hydrocarbon-reservoir of special construction, especially a reservoir with constant liquid-level—in fact, an ordinary gasolene vessel of any shape may serve as the reservoir. This obviates the necessity of any manipulation or transferring of the hydrocarbon.

Instead of hydrocarbon being placed in the apparatus itself, as is the case in all existing carbureters, in which the hydrocarbon soon attacks the metal of which it is constructed, this apparatus only contains water, which attacks the metal to a less extent. The system may also be readily applied to existing carbureters. The feeder being necessary in any plant, it cannot be considered an extra expense.

The composition of the gas can be determined at will as considered most favorable by modifying the relation between the diameters of the pulleys or wheels on the meter and feeder, respectively. For instance, gas which is very poor in hydrocarbon can be produced in order to avoid all condensation in the conduits, as in this case the hydrocarbon vapors will be removed from their point of saturation.

I declare that what I claim is—

1. The combination of a chamber having an air-inlet, an inlet for a volatile liquid and a carbureted-air outlet, said chamber being partially filled with a non-volatile liquid, and a movable member located in said chamber and arranged to convey the vaporizable liquid which floats on the non-volatile liquid, toward the outlet of said chamber.

2. The combination of the carbureter or vaporizer proper having an air-inlet, an inlet for the volatile liquid and a carbureted-air outlet, a feeder-chamber partially filled with a non-volatile liquid and provided with an inlet and an outlet for the liquid to be vaporized, the outlet of the feeder being connected with the inlet of the vaporizer, a movable feeder located in said chamber and arranged to dip into said non-volatile liquid and to convey the vaporized liquid which floats on the non-volatile liquid toward the outlet of the feeder-chamber, and means for operating the feeder.

3. The combination of a chamber having an air-inlet, an inlet for a volatile liquid and a carbureted-air outlet, said chamber being partially filled with a non-volatile liquid, and a movable member located in said chamber and dipping into the non-volatile liquid, said member being arranged to convey the vaporizable liquid which floats on the non-volatile liquid, toward the outlet of said chamber.

4. The combination of the carbureter or vaporizer proper having an air-inlet, an inlet for the volatile liquid, and a carbureted-air outlet, a feeder-chamber adapted to contain a non-volatile liquid and provided with an inlet and an outlet for the liquid to be vaporized, and also provided with a depending partition forming a seal or trap, a feeder mounted to rotate in said chamber about an inclined axis and carrying scoops or cups adapted to pass alternately above the non-volatile liquid on one side of the said partition and then down into said liquid to the other side of the partition, a connection from the outlet of the feeder-chamber to the inlet of the vaporizer, and means for rotating the feeder.

5. The combination of a feeder-chamber having an air-inlet and a carbureted-air outlet, and connected with a supply of vaporizable liquid, a movable feeder arranged in said chamber and constructed to convey the liquid to the outlet of said chamber, and a combined vaporizer and vapor-feeder connected with the outlet of the feeder-chamber and containing a body of non-volatile liquid, and a movable member dipping into said non-volatile liquid and arranged to convey the vaporizable liquid which floats on the non-volatile liquid, and the vapor formed therefrom, toward the outlet of the vaporizer.

6. The combination of the vaporizer-chamber having a carbureted-air outlet and partially filled with a non-volatile liquid, a device for feeding a vaporizable liquid and air to said chamber, and a rotatable conveying-screw dipping into said non-volatile liquid.

7. A feed device, comprising a chamber having an inlet and an outlet for the material to be fed, and also provided with a depending partition forming a seal or trap, a feeder mounted to rotate in said chamber about an inclined axis and provided with scoops or cups adapted to pass alternately to an upper position on one side of said partition and to a lower position on the other side of the partition.

In testimony that I claim the foregoing as my invention I have signed my name, in presence of two witnesses, this 6th day of November, 1900.

BENJAMIN ALFRED GUY.

Witnesses:
J. ALLISON BOWEN,
ARTHUR GOOD.